United States Patent

[11] 3,586,835

| [72] | Inventor | Adolph W. Foeh, Jr. |
| --- | --- | --- |
| | | San Antonio, Tex. |
| [21] | Appl. No. | 722,743 |
| [22] | Filed | Apr. 19, 1968 |
| [45] | Patented | June 22, 1971 |
| [73] | Assignee | The United States of America as represented by the Secretary of the Air Force |

[54] DIGITAL CARDIOTACHOMETER
3 Claims, 3 Drawing Figs.
[52] U.S. Cl. .................................................. 235/92,
235/150.3
[51] Int. Cl. .................................................. G06m 1/38
[50] Field of Search .......................................... 235/92,
150.53, 150.3; 307/269, 271; 328/142; 324/78

[56]  References Cited
UNITED STATES PATENTS
| 3,280,309 | 10/1966 | Villwock | 235/92 |
| --- | --- | --- | --- |
| 2,889,987 | 6/1959 | Marcus | 235/132 |

Primary Examiner—Maynard R. Wilbur
Assistant Examiner—Robert F. Gnuse
Attorneys—Harry A. Herbert, Jr. and Julian L. Siegel ABSTRACT: A digital cardiotachometer having a down counter with a hyperbolic rate that is started and terminated by successive heartbeats and the heartbeat is read out of a register. The counter output is also fed into a logic circuit which inhibits pulses in the counter in a feedback loop to obtain the hyperbolic counter rate. The highest expected heart rate is initially reset into the counter which starts its hyperbolic countdown after a delay that is controlled by the counter itself. The logic circuit generates a pulse which switches the input to the counter through a gating circuit, from linear to hyperbolic input pulses.

INVENTOR.
ADOLPH W. FOEH JR.

3,586,835

DIGITAL CARDIOTACHOMETER

BACKGROUND OF THE INVENTION

This invention relates to a pulse rate measuring apparatus, and more particularly to a digital device that converts the time interval between heartbeats to a rate in beats per minute.

In the past, electrocardiograms have been monitored during manned space flights to detect conduction and rhythm disturbances and to compute heart rate. Few, if any, cardiac abnormalities have been recorded during these flights. The heart rate has, however, proved to be quite valuable for indicating relative levels of activity. Further, by displaying the heart rate on a beat-to-beat basis, it is possible to derive respiratory information.

To reduce the vehicle-to-ground telemetry data load it would be desirable to convert the electrocardiogram into a rate type of signal on board the vehicle. Such a low bit rate parameter can be readily stored on magnetic tape and the accumulated data periodically telemetered to the ground. The heart rate can also be telemetered in real time whenever the vehicle is over a ground station.

Devices capable of measuring the heart rate on a beat-to-beat basis are known as cardiotachometers. An electrocardiogram waveform is provided at the input. Input circuits amplify and filter the electrocardiogram and detect the peak of the R-wave which is used to measure the time interval between beats and compute rate. The output is generally scaled to provide the resultant rate in beats per minute.

It is obvious that any cardiotachometer used in a space vehicle will have to be highly reliable, small in size, use little power and require no attention. Both analog and digital cardiotachometers have been built. Analog devices frequently contain an internally generated ramp voltage which is started on one beat of the heart and terminated by the next. The height of the ramp is then inversely proportional to the heart rate. A disadvantage of this technique is that the output is not linear with rate and small variations, at high heart rates, are difficult to interpret accurately. In addition, most ramp voltage generators have nonlinear aging characteristics and poor temperature tolerance which make this type of device unacceptable for aerospace applications. This same disadvantage also holds true for other analog cardiotachometers.

Digital devices may depend on an internally generated hyperbolic voltage which drives a voltage controlled oscillator. The oscillator drives a counter which is read and reset at each beat of the heart. The accuracy achievable with this method is dependent on the accuracy of the hyperbolic voltage. A variation of this technique depends on changing the input frequency to a counter in steps which result in a straight line segment approximation to a hyperbolic countdown. Another approach is to employ the "hardware divide routine" commonly used in digital computers. With this method a counter is triggered by an accurate clock during the time interval between beats. The value in the counter is then divided into a constant, using hardware divide circuits.

SUMMARY OF THE INVENTION

The cardiotachometer of the present invention is a time interval to rate converter for providing instantaneous rate between successive beats of the heart. An electrocardiogram signal is provided at the input. At each beat of the heart, the heart rate as determined from the time interval between that beat and the previous beat, is presented at the output in beats per minute. The conversion can be considered to be the division of the number 60 by the time interval measured in seconds. This division is accomplished artificially by digital logic in the feedback path from the outputs of the binary counter to the input of the counter. The counter functions as an accumulator of time since the last heartbeat and provides the input to a logic configuration which enables only selected input pulses to trigger the counter. The design of the logic forces the counter to count down from 200 to 40 at times which are consistent with time intervals corresponding to integer heart rates between 200 and 40 beats per minute. When the next heartbeat occurs, the value in the counter is gated into an output register and the cycle is repeated.

A realistic requirement for a space flight cardiotachometer is an accuracy of 1 beat per minute over a range of 40 to 200 beats per minute and a binary output. The present invention discloses such a digital cardiotachometer that uses digital feedback to generate the inverse function needed for time interval to rate conversion. The invention has a range of 40 to 200 beats per minute in integer values, with an accuracy of 0.75 beats per minute over this range. It is highly stable and requires no calibration nor adjustment. The output consists of an 8-bit parallel straight binary word at each beat of the heart.

It is therefore an object of this invention to provide a novel apparatus for determining the heartbeat rate.

It is another object to provide a cardiotachometer having great accuracy and requiring the smallest number of digital circuits.

It is another object to provide an apparatus for conversion of heartbeat interval to rate in real time and to provide the output in digital format.

It is another object to provide a cardiotachometer that can obtain data during manned space flights.

These and other advantages, features and objects of the invention will become more apparent from the following description taken in connection with the illustrative embodiment in the accompanying drawings, wherein:

DESCRIPTION OF THE PREFERRED EMBODIMENT

Basically the invention consists of a binary counter, a clock, a logic circuit which generates pulses dependent on the value currently in the counter, and a variable length pulse generator which produces inhibit pulses at the counter input. A cycle of an operation is repeated for each heartbeat and is described as follows:

The counter is reset to a value by each heartbeat such that at the end of 300 milliseconds the counter contains the value 200. During the first 300 milliseconds following each heartbeat the counter counts down linearly. Just before the 200 count is reached a pulse is generated which starts the hyperbolic countdown. If selected pulses from a constant pulse train (clock) are inhibited, the counter counts down at a hyperbolic rate and thus maintains step with integer values of heart rate from 200 to 40 beats per minute. This is achieved by logic based on the present count in the counter, which functions as a tabulator of the amount of time elapsed since the last heartbeat. The logic generates pulses which set the variable length pulse generator, the output of which inhibits the counter input. When the next heartbeat arrives, the correct rate is contained in the counter and is gated out by a pulse coincident with the heartbeat.

Figure 1:
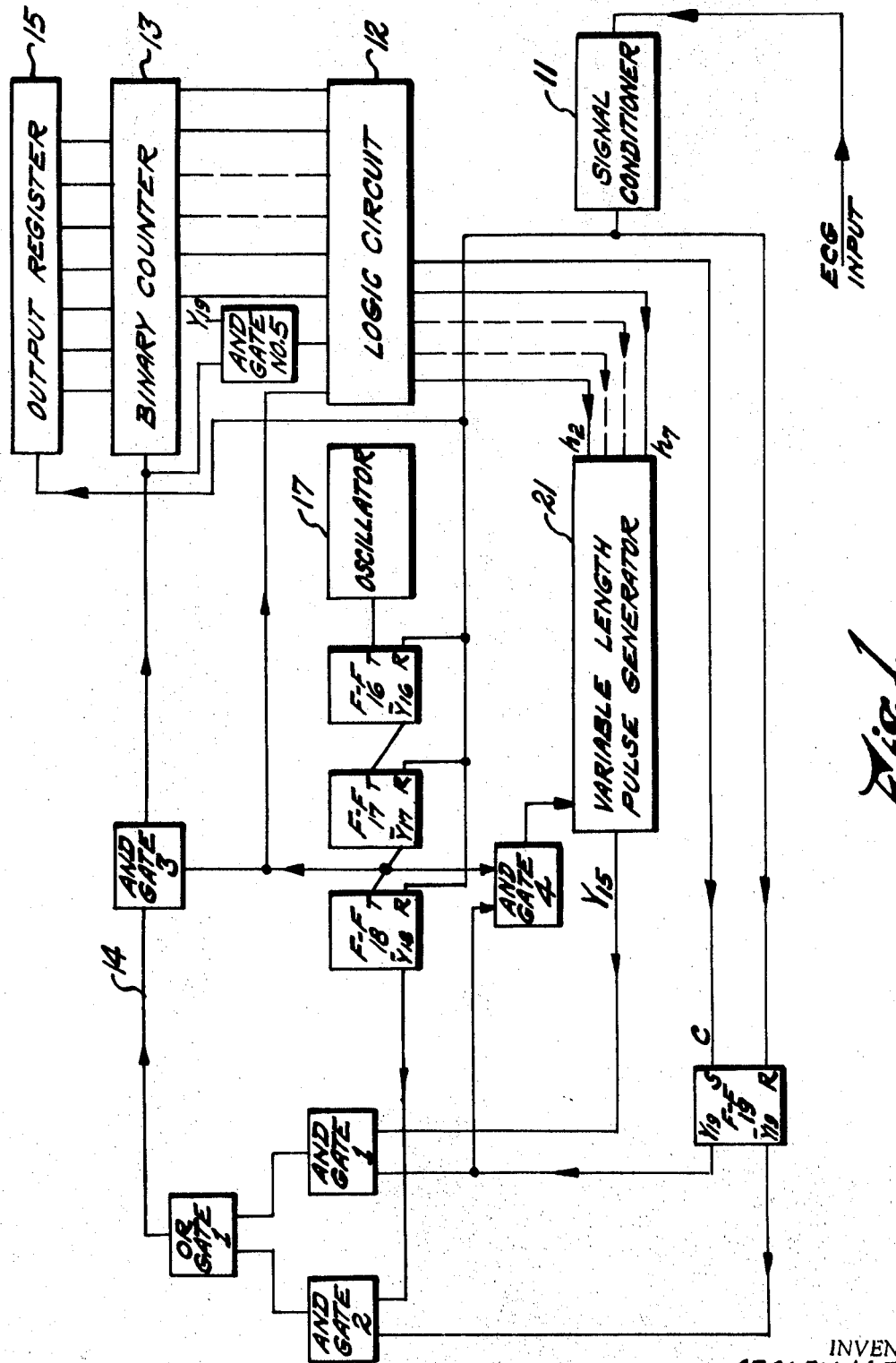
FIG. 1 is a block diagram showing an embodiment of the invention.

FIG. 1 shows a block diagram of the cardiotachometer. An R-Wave signal from an electrocardiogram (ECG) is fed to signal conditioner 11. The output of the signal conditioner coincident with the R-Wave gates the previous heart rate out of counter 13 into output register 15 and resets flip-flops 16—19, register 15, and counter 13. The output of the flip-flops are explained using the symbol Y for the "True" output and $\overline{Y}$ for the "False" output. Flip-flops 16—18 are used as a frequency divider of oscillator 17. In the present embodiment of the invention oscillator 17 is an 8 kHz. multivibrator and consequently flip-flops 16—18 have output frequencies of 4 kHz., 2 kHz., and 1 kHz. respectively. Since flip-flop 19 has been reset, $\overline{Y}_{19}$ is on and the output of AND gate 2 turns on and off at the 1 kHz. rate of $\overline{Y}_{18}$. The output of pulse AND gate 3 is controlled by the logic input at 19 through AND gate 2 and OR gate 1 and delivers 1 kHz. pulses to drive binary counter 13. When counter 13 reaches 202, a pulse (C) generated by logic circuit 12 sets flip-flop 19 on, making $Y_{19}$ high and $\overline{Y}_{19}$ low. AND gate 3 is now controlled by $\overline{Y}_{15}$, the output of variable length pulse generator 21, through AND gate 1 and OR gate 1. AND gate 3 now drives counter 13 with a decreasing pulse repetition rate and the counter counts down from 201. Thus, the correct heartbeat rate is contained in counter 13 when the next heartbeat occurs and is gated into output register 15 by the reset pulse. Logic circuit 12 uses for an input the outputs of the flip-flops of counter 13 to generate pulses $h_2$ through $h_7$. Pulses $h_2$ through $h_7$ cause $Y_{15}$ to go low for 0.5, 1, 2, 4, 8 or 16 msec. respectively. Various combinations of these pulses are generated by the logic which allows the hyperbolic countdown of the counter.

The following table shows the timing of the counter:

| I | II | III | IV | V |
|---|---|---|---|---|
| Flipflop "True" output | Flipflop "False" output | Heart rate (b.p.m.) | Time interval (msec.) | Pulse arrival time (msec.) |
| 00110110 | 11001001 | 201 | 298.51 | 297.77 |
| 00110111 | 11001000 | 200 | 300.00 | 299.25 |
| 00111000 | 11000111 | 199 | 301.51 | 300.75 |
| 00111001 | 11000110 | 198 | 303.03 | 302.27 |
| . | . | . | . | . |
| . | . | . | . | . |
| . | . | . | . | . |
| 11010010 | 00101101 | 45 | 1,333.33 | 1,318.84 |
| 11010011 | 00101100 | 44 | 1,363.64 | 1,348.48 |
| 11010100 | 00101011 | 43 | 1,395.45 | 1,379.54 |
| 11010101 | 00101010 | 42 | 1,428.57 | 1,412.01 |
| 11010110 | 00101001 | 41 | 1,463.41 | 1,445.99 |
| 11010111 | 00101000 | 40 | 1,500.00 | 1,481.70 |

Column IV indicates the time interval between beats which corresponds to the values of heartbeat rate in Column III. The time resolution required is determined by the difference in time intervals of the 199 and 200 beats per minute rates, or approximately 1.5 msec. Improved accuracy is gained by triggering the counter at the midpoint between successive time intervals in Column IV. These times are given in Column V.

Signal conditioner 11 can consist of an amplifier, narrow band filter, double differentiation circuits, and a pulse generator. The filter reduces unwanted noise spikes before they reach the differentiators where their effect would be magnified. The differentiation circuits prevent false triggering due to baseline shifts in the electrocardiogram. The proper operation of this circuit is not affected by baseline shifts equal to the normal R-Wave amplitude which occur during the time interval between heartbeats. The output of the signal conditioner is a control pulse coincident with each heartbeat that gates the previous heart rate into the output register, initializes the counter, and synchronizes the local clock to the heartbeat.

Figure 2:
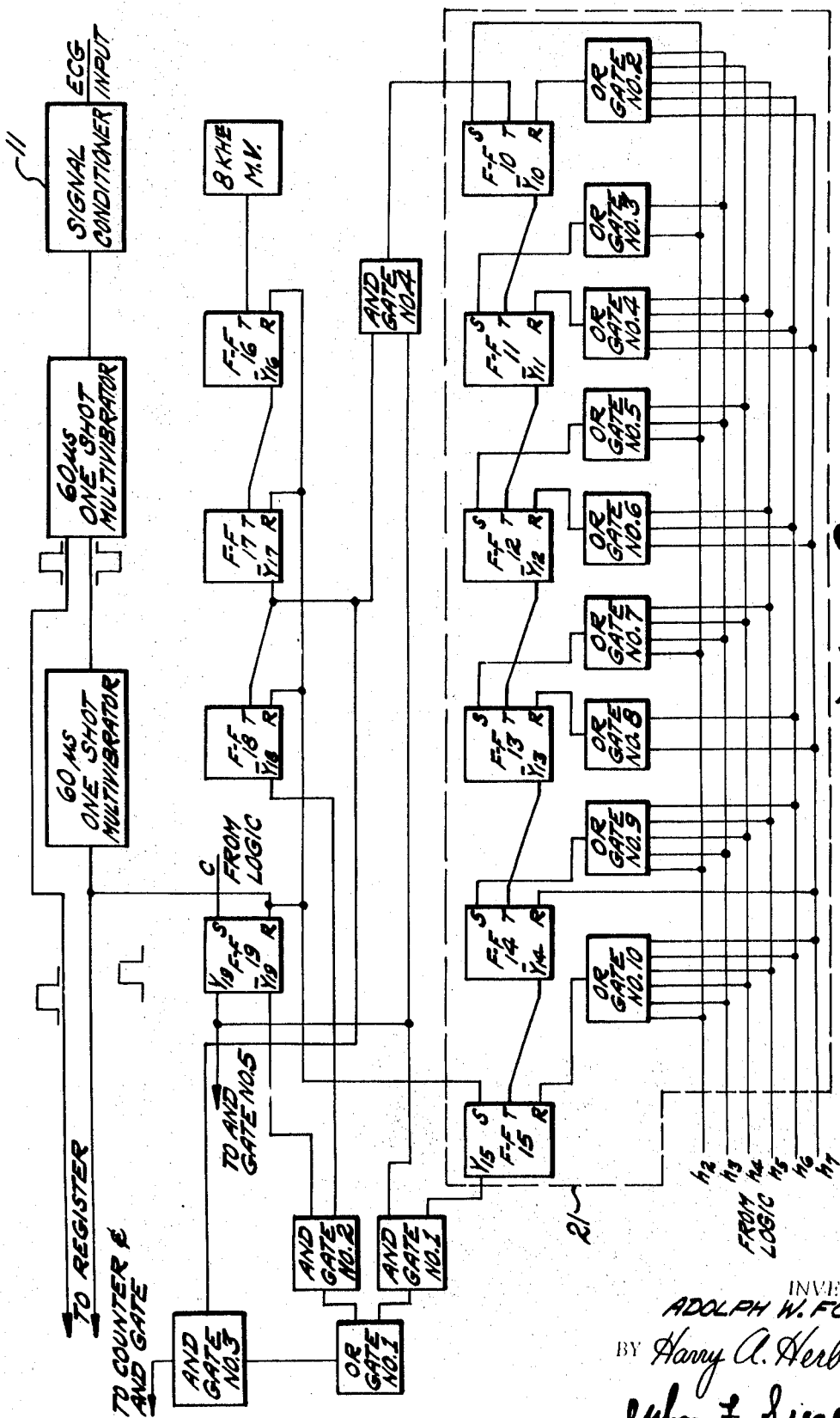
FIG. 2 shows the pulse input circuit, the oscillator circuit, the counter input logic, and the variable length pulse generator.
Figure 3:
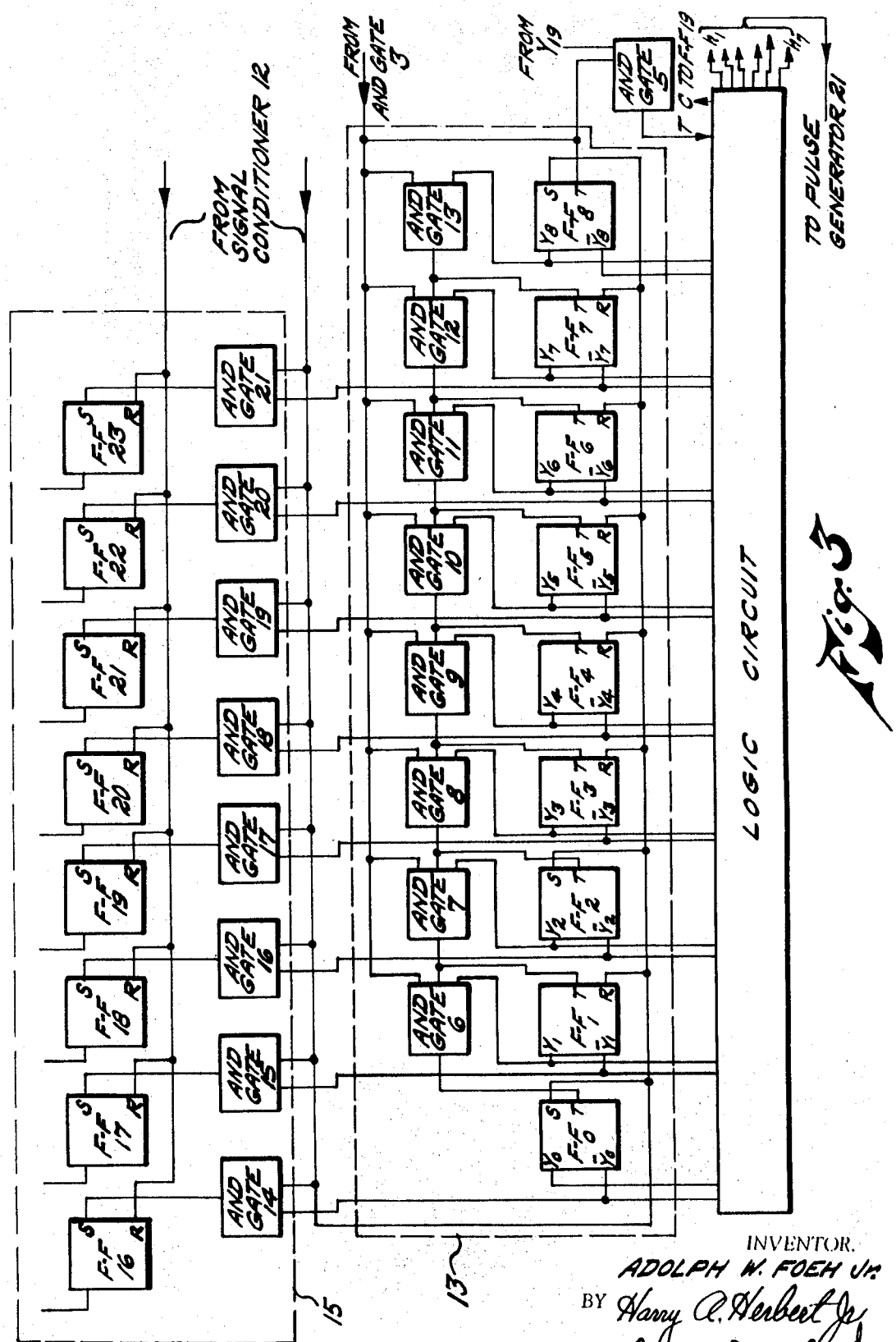
FIG. 3 shows the output register, the binary counter, and the logic circuit.

Referring to FIGS. 2 and 3, counter 13 comprises nine R-S-T flip-flops 0—8 connected to count straight binary and flip-flops 16—23 comprise the output register. The initial value of counter 13 is set by reset pulse to enter 101000001 into flip-flops 0—8 where flip-flops 8 represent the least significant bit in the counter. Only the eight most significant bits of the counter are gated into output register 15 by the register pulse. Thus, two trigger pulses must arrive before the effective value in the counter changes. This allows delays in the countdown equal to the sum of any two pulse lengths produced by variable length pulse generator 21. The heart rate gated into output register 15 remains until replaced by the next heart rate value.

The following table lists the functions performed by logic circuit 12.

LOGIC FUNCTIONS $$h_2 = T[\overline{Y}_0\overline{Y}_1Y_2\overline{Y}_8Y_3(Y_4+Y_5Y_6) + \overline{Y}_0Y_1\overline{Y}_2\overline{Y}_8\overline{Y}_3(\overline{Y}_4\overline{Y}_6\overline{Y}_7 \\ -Y_4Y_5Y_7+Y_4Y_5Y_7+\overline{Y}_0Y_1\overline{Y}_2Y_8Y_3Y_4(Y_5\overline{Y}_7+Y_5Y_6 \\ +Y_6Y_7)+\overline{Y}_0Y_1Y_2Y_8\overline{Y}_3(\overline{Y}_4+\overline{Y}_5Y_6)]$$

$$h_3 = T[Y_0Y_1\overline{Y}_2\overline{Y}_8(Y_3+Y_4Y_7+Y_4Y_5+\overline{Y}_6Y_7+\overline{Y}_4Y_6\overline{Y}_7) \\ +\overline{Y}_0Y_1Y_2\overline{Y}_8\overline{Y}_3(\overline{Y}_4+\overline{Y}_5\overline{Y}_6+\overline{Y}_5\overline{Y}_7)+\overline{Y}_0Y_1Y_2Y_8Y_3Y_4\overline{Y}_7 \\ +\overline{Y}_0Y_1\overline{Y}_2Y_8\overline{Y}_3(\overline{Y}_4+\overline{Y}_5)]$$

$$h_4 = T[\overline{Y}_0Y_1\overline{Y}_2\overline{Y}_8(Y_3+Y_4Y_5+Y_4Y_6Y_7)+Y_0\overline{Y}_1\overline{Y}_2\overline{Y}_8\overline{Y}_3(\overline{Y}_4 \\ +\overline{Y}_5)+Y_0\overline{Y}_1\overline{Y}_2Y_8Y_3Y_4(Y_7+Y_5Y_6)+Y_0\overline{Y}_1Y_2Y_8\overline{Y}_4 \\ (\overline{Y}_3+Y_5\overline{Y}_6+Y_6\overline{Y}_7+\overline{Y}_5Y_6)+Y_0\overline{Y}_1Y_2Y_8\overline{Y}_3\overline{Y}_5\overline{Y}_6\overline{Y}_7]$$

$$h_5 = T[Y_0\overline{Y}_1\overline{Y}_2\overline{Y}_8(Y_3+Y_4Y_5)+Y_0\overline{Y}_1Y_2\overline{Y}_8\overline{Y}_3(\overline{Y}_4 \\ +\overline{Y}_5\overline{Y}_6\overline{Y}_7)+Y_0\overline{Y}_1Y_2Y_8Y_3(Y_4+Y_5Y_6Y_7)]$$

$$h_6 = T[Y_0\overline{Y}_1Y_2\overline{Y}_8(Y_3+Y_4Y_7+Y_4Y_6+\overline{Y}_3Y_4Y_5) \\ +Y_0Y_1\overline{Y}_2Y_8(\overline{Y}_3Y_4Y_5+Y_3Y_4Y_6+Y_3\overline{Y}_4\overline{Y}_5\overline{Y}_6)]$$

$$h_7 = T[Y_0Y_1\overline{Y}_2\overline{Y}_8Y_3+Y_0Y_1\overline{Y}_2Y_3Y_4(Y_5+Y_6+\overline{Y}_6\overline{Y}_8)]$$

$$C = \overline{Y}_0\overline{Y}_1Y_2Y_3\overline{Y}_4Y_5\overline{Y}_6Y_7Y_8$$

$$T = Y_{19}Tr$$

where "$Tr$" is the trigger input to the counter.

The input variables are $Y_0$ through $Y_8$ and their complements, $Y_{19}$ and Trigger. The outputs are $C$ and $h_2$ through $h_7$. It is through the logic that the time interval to rate conversion is achieved. Based on the inputs, thus the amount of time elapsed since the last heartbeat, the logic provides the proper pulse to the variable length pulse generator which enables the counter, allowing it to maintain step with integer values of heart rate.

The equations in the above table are but one set of many which could be used to accomplish the conversion. They represent the least complicated configuration from the viewpoint of hardware implementation.

Referring to FIG. 2, variable length pulse generator 21 delivers an input pulse of length 0.5, 1, 2, 4, 8 or 16 msec., determined by the presence of a pulse on one of the six input lines $h_2$ through $h_7$. Only one pulse at a time arrives at any input because of the logic configuration. The "true" output $Y_{15}$ of flip-flop 15 is initially set high by the reset heartbeat pulse to prevent a lock-up of the counter due to $Y_{15}$ being low immediately after $Y_{19}$ goes high.

The pulse generator 21 is simply a ripple-through binary counter which uses the "true" output of the most significant bit as its output. It is triggered at the $T$ input of flip-flop 10 at a 2 kHz. rate during the time flip-flop 19 is high.

| h | $Y_{15}$ | $Y_{14}$ | $Y_{13}$ | $Y_{12}$ | $Y_{11}$ | $Y_{10}$ |
|---|---|---|---|---|---|---|
| $h_4$ (set) | 0 | 1 | 1 | 1 | 0 | 0 |
| Clock pulse | 0 | 1 | 1 | 1 | 0 | 1 |
| Do | 0 | 1 | 1 | 1 | 1 | 0 |
| Do | 0 | 1 | 1 | 1 | 1 | 1 |
| Do | 1 | 0 | 0 | 0 | 0 | 0 |

For example, a pulse on the $h_4$ line sets flip-flops 10, 11, and 15 through OR gates 2, 4, and 10 respectively, and sets flip-flops 12, 13, and 14 on through OR gates 5, 7, and 9. Four pulses must trigger the generator before $Y_{15}$ becomes high.

Referring now to FIG. 1, it can be seen that counter 13 is inhibited during the four clock pulses since $Y_{15}$ is off and $\overline{Y}_{19}$ is off because flip-flop 19 has been set on by $C$. Thus the logic input of AND gate 3 is "false" and counter 13 is inhibited. AND gate 3 enables the fifth pulse to trigger the counter since $Y_{15}$ propagates through AND gate 1 and OR gate 1 to the logic input and opens the gate. $Y_{15}$ remains on, allowing pulses (but never more than two) to pass the gate until another $h$ pulse is generated by the logic. This continues until the next heartbeat pulse arrives which completes a cycle of operation.

Although a straight binary output has been described, decoders can be used to provide an output with any code desired, including decimal. Conversion from straight binary to binary coded decimal can be accomplished serially during the 200 msec. waiting period with the addition of a small amount of circuitry. The output can be provided in series instead of parallel by gating the output register sequentially at each heartbeat. An analog output can be achieved by use of digital-to-analog converter.

The range can be extended downward to 5 beats per minute by changing the local clock frequency and gating the output from a different set of flip-flops. For example, utilization of flip-flops 6 through 0 as the output and a 4 kHz. clock frequency provides a range of 100 to 20 beats per minute. This is true since division by 2 in the binary number system is accomplished by shifting the "decimal" point one place to the left. Repeating this procedure provides ranges of 50 to 10 and 25 to 5 beats per minute.

Although the invention has been described with reference to particular embodiments, it will be understood to those skilled in the art that the invention is capable of a variety of alternative embodiments within the spirit and scope of the appended claims.

I claim:
1. A digital system for determining the rate of heartbeats comprising:
  a. a binary down counter;
  b. means for starting the counter upon reception of the first heartbeat;
  c. a logic circuit fed by the outputs of the counter;
  d. a pulse inhibiting circuit fed by the logic circuit originating from the current count in the counter for controlling the rate of a counter;
  e. means for terminating the counter upon reception of the second heartbeat; and
  f. an output register fed by the counter, the register indicating heartbeat rate.

2. A digital system according to claim 1 wherein the logic circuit is hyperbolic for rendering the rate of the counter hyperbolic.

3. A digital system according to claim 1 wherein the rate controlling means is a variable length pulse generator.